United States Patent [19]
McClure et al.

[11] Patent Number: 5,111,502
[45] Date of Patent: May 5, 1992

[54] TELEPHONE LINE BRIDGING SENSOR

[75] Inventors: William C. McClure, Denver, Colo.; Bob D. Kunce, Joplin, Mo.; John Q. McClure, Aurora, Colo.

[73] Assignee: Command Communications, Inc., Aurora, Colo.

[21] Appl. No.: 514,131

[22] Filed: Apr. 25, 1990

[51] Int. Cl.⁵ .................................. H04M 3/22
[52] U.S. Cl. .................................. 379/380; 379/161; 379/184; 379/377; 379/393
[58] Field of Search .............. 379/161, 184, 377, 380, 379/393, 379

[56] References Cited

U.S. PATENT DOCUMENTS

| | | | |
|---|---|---|---|
| 3,671,679 | 6/1972 | Knauer | 379/377 |
| 4,087,646 | 5/1978 | Brolin et al. | 379/380 |
| 4,099,032 | 7/1978 | Roge et al. | 379/380 X |
| 4,277,648 | 7/1981 | Glassman | 379/377 X |
| 4,304,970 | 12/1981 | Fahey et al. | 379/377 |
| 4,317,964 | 3/1982 | Biggs et al. | 379/377 X |
| 4,451,707 | 5/1984 | Hanscom . | |
| 4,667,065 | 5/1987 | Bangerter . | |
| 4,674,117 | 6/1987 | Burns | 379/377 |
| 4,686,700 | 8/1987 | Perry | 379/377 X |
| 4,802,207 | 1/1989 | Uchida | 379/377 X |
| 4,899,372 | 2/1990 | Wahi et al. | 379/184 |
| 4,935,959 | 6/1990 | Markovic et al. | 379/377 |
| 4,958,371 | 9/1990 | Damoci et al. | 379/377 |
| 4,985,916 | 1/1991 | Tachuk et al. | 379/184 X |

FOREIGN PATENT DOCUMENTS

| | | | |
|---|---|---|---|
| 0029157 | 1/1989 | Japan | 379/377 |
| 0060350 | 2/1990 | Japan | 379/377 |

Primary Examiner—James L. Dwyer
Assistant Examiner—Magdy Shehata
Attorney, Agent, or Firm—James E. Pittenger

[57] ABSTRACT

A telephone line bridging sensor circuit is provided which provides a variable output frequency signal to a microprocessor for measuring and storing the frequency count on a periodic basis. The circuit includes an isolation transformer to isolate the audio component of the telephone line from the sensing circuit. The loop current present in the telephone line is rectified through a full wave diode rectifier and the output of the rectifier is filtered and regulated to provide an input voltage to an astable, voltage controlled oscillator. As the current on the telephone line varies, the input voltage to the oscillator also varies a proportionate amount causing the output frequency of the oscillator to change accordingly. The output frequency is fed through an optical coupler to a suitable microprocessor circuit for measuring, storing and comparing the frequency readings on a periodic basis to detect differential change in the output frequency indicative of one or more telephone devices bridging the telephone line at the same time.

15 Claims, 1 Drawing Sheet

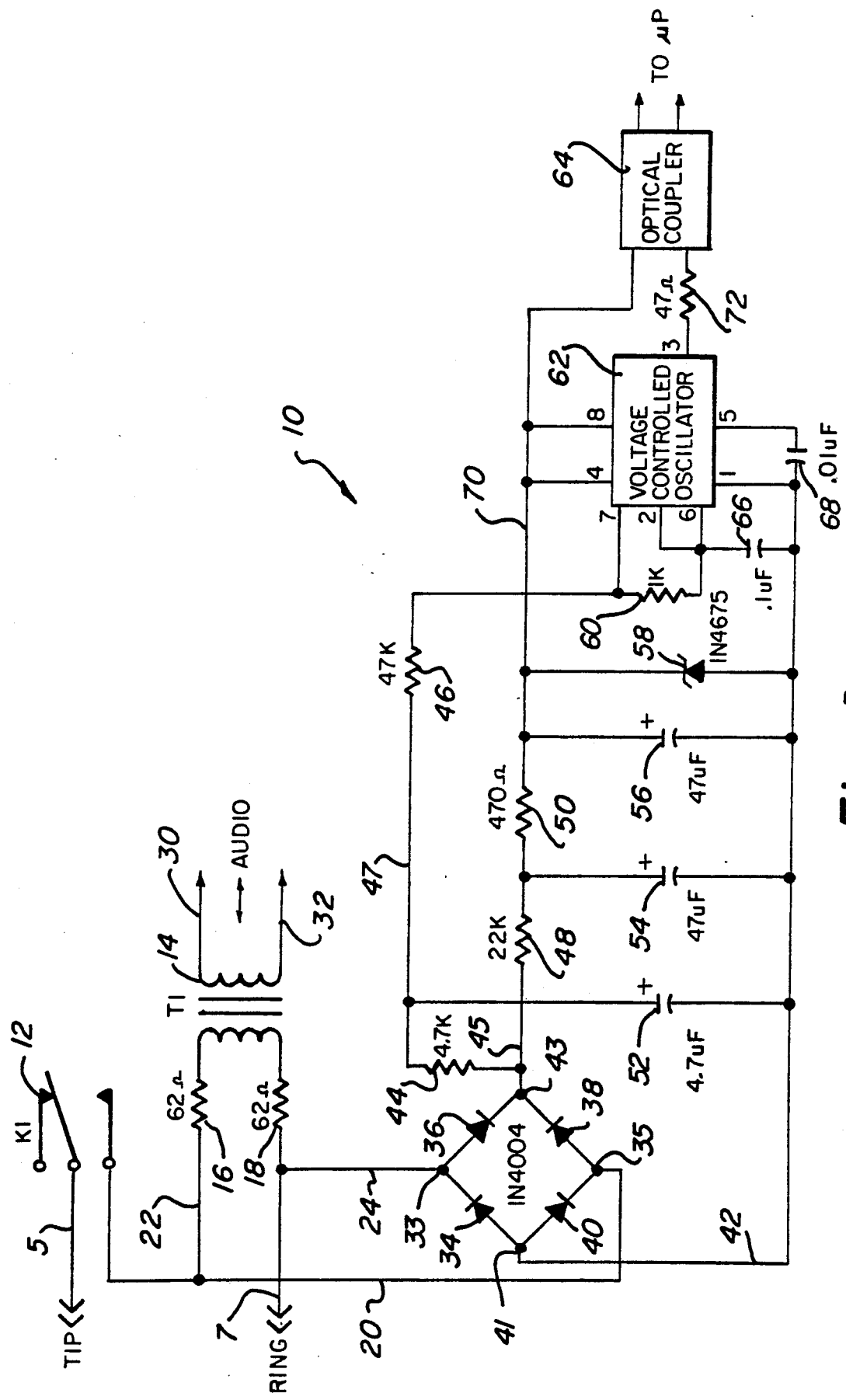
Fig_1

TELEPHONE LINE BRIDGING SENSOR

FIELD OF THE INVENTION

This invention is directed to a sensor for detecting an off-hook condition on a telephone line. It is more specifically directed to an apparatus and method for electronically sensing when one or more telephone devices connected to a single telephone line go to an off-hook condition.

BACKGROUND OF THE INVENTION

In the past it has been common practice to measure through analog methods the impedance or current across a given telephone line in an attempt to determine when a telephone device has bridged or has been connected to the line. This method was also attempted in trying to determine if an additional telephone device has answered the line or gone off-hook while at the same time another device is already using the telephone line. This condition is attributable to such situations as a wire tap condition when other listening or answering devices are present on the same telephone line or when an extension telephone attempts to access a telephone line when the line is already in use.

Other existing telephone devices use a similar type of detection circuit to determine if the called telephone line is answered by a telephone set or in the absence of detecting the off-hook condition would then determine that an answering machine or similar device should respond and connect the line. In this way, answering machines and similar devices are capable of sequencing a response so as to provide a desired answering or connecting function.

During the course of recent years, it has become also quite popular to use microprocessors in the type of machines which answer and respond to telephone lines. In some cases, the microprocessor is arranged to directly measure the actual voltage that is on the telephone line when the ring voltage is present. When a telephone set or other telephone responding device answers the line the ring signal is interrupted indicating that the line has been answered. Various other devices have been suggested to sense or measure a change in the line voltage which is present on the telephone line in order to determine if and when the line has been answered.

It is now becoming evident that a more sensitive and reliable, and yet inexpensive, circuit is required in order to be able to detect when a telephone device has gone off-hook especially when the line has already been answered by another device. This is true when it is necessary to control or sequence the presence of various devices on the same telephone line. Through the use of a bridging sensor circuit, it is feasible that sequential control of the telephone line can be accomplished to allow proper operation so that the same telephone line can be used for multipurposes. In this way, a single telephone line can be used for the sequenced transmission of voice or data through either a telephone set, facsimile machine, computer modem, point of sale register or other similar device. This arrangement can save considerable expense in eliminating the requirement for dedicated telephone lines if a single telephone line can be used for all of these functions.

In most prior art arrangements, it is necessary to connect a branching switch directly to the telephone line and then, selectively switch the various devices as required. This arrangement necessitates the rewiring of the telephone system for the connection and positioning of the branching switch. It is highly desirable to allow the branching switch to control the individual telephone line, but also eliminate the necessity for rewiring and installing the switch on an existing telephone line ahead of all existing down-line devices.

It is an object of the present invention to accurately and quickly sense when a telephone device and any number of other telephone devices connected to the same telephone line go off-hook simultaneously or at various times. By sensing this condition, it is possible for a branching switch to sequentially control the connection of the various telephone devices so that one will not interfere with the other so as to obtain maximum use of the connected telephone line.

It is a further object of the present invention to provide a bridging sensor which is more accurate and foolproof than existing analog or digital sensors.

It is a still further object of the present invention to provide an off-hook sensor with improved sensitivity and accuracy and which is not subject to long term drift as a result of sensor or component tolerances or environment changes.

It is a still further object of the present invention to provide a sensor which detects when a bridging telephone device goes back to the on-hook condition.

INFORMATION DISCLOSURE STATEMENT

This statement is included to comply with the inventors' acknowledged duty to notify the Patent Office of any and all information to which the inventors are aware which has any direct bearing on the examination of this application.

The Bangerter patent (U.S. Pat. No. 4,667,065) discloses a method and apparatus for electronically determining whether audio signals which are present on a telephone line are voice signals indicating that the telephone line has been answered or are some other type of noise or system generated signal. The incoming audio signal is connected to an audio detector and a digitizer. The output signals from both of these devices are fed to a central processing unit which analyzes the data and periodically compares the data with a base reference to determine whether the audio signal is or is not a voice response. An analog to digital converter is used to convert the audio signals into a high and low voltage input to the central processing unit. The sensing of a voice signal produces an output from the processing unit to indicate that the telephone line has been actually answered.

The Hanscom patent (U.S. Pat. No. 4,451,707) discloses a ring detector and telephone line monitoring system which monitors the telephone line voltage. It also responds to actual line voltage differentials to cause an answering machine to reset. A series of transistors and operational amplifiers are used to monitor the various voltage changes which take place on the telephone line. Although Hanscom provides a simple circuit, he fails to provide a rectifier and voltage controlled oscillator arrangement which is required in the Applicatants' invention to provide the novel results obtained. The Applicatants' invention provides a much more sensitive and accurate sensing function.

SUMMARY OF THE INVENTION

The present invention is a telephone bridging sensor which can detect when a telephone line has been bridged by one or more telephone devices. It is composed of a diode bridge which is tip-ring polarity guarded. The voltage from tip to ring across the diode bridge can be filtered and regulated to a nominal 2 volts D.C. and provides operational and reference voltage for a voltage controlled oscillator. The voltage controlled oscillator is configured as an astable oscillator. The values of the capacitance and resistance connected to the oscillator is predetermined to provide a desired reference frequency indication of the nominal voltage on the line. In the present disclosure the values of the components are selected to provide a frequency of approximately 1 khz with a loop current in the connected telephone line of approximately 30 milliamperes.

As the loop current in the telephone line varies, the voltage applied to the input of the oscillator through a charging resistor varies the output frequency of the oscillator in direct proportion to the actual change in the loop current present on the telephone line.

When the circuit of the present invention is connected across the telephone line, the loop current then present in the telephone circuit establishes the base frequency of the oscillator which is recorded by a central processing unit present in an associated device. Periodically thereafter at predetermined time intervals a frequency counter is triggered to count the frequency of the oscillator and compare the recorded frequency with the base or reference frequency. If a first or additional telephone device connected to the same telephone line goes off-hook, the subsequent change in impedance in the line produces a change in the loop current and thus, the voltage input to the oscillator decreasing the frequency of the oscillator which is sensed by the central processing unit. Once the deviation in the frequency exceeds a predetermined value an output signal is generated by the processing unit to indicate that a first or additional telephone device has gone off-hook and is bridging the telephone line.

The bridging sensor which is provided by the present invention is capable of producing an accuracy of better than 1/10th of 1 percent. At the same time, the sensor is recalibrated and a new base reference frequency is established periodically or each time a call is received from the telephone central office which eliminates any problems due to drift in the components provided within the sensor or any change in the existing environmental conditions. Thus, the sensor is periodically measuring and recalibrating itself each time a changed condition occurs. In addition, the sensor which is provided in the present invention will work in the reverse and detect when the additional bridging devices go back on-hook and are thus, operationally disconnected from the telephone line.

Although uses for the present invention have been previously discussed, it is anticipated that the circuit which is provided under the present invention can be used in various types of telephone equipment which require the sensing of bridging devices on an existing telephone line. This type of sensing is important in telephone branching devices, telephone answering machines, emergency dialing devices and wire-tap detecting devices.

BRIEF DESCRIPTION OF THE DRAWINGS

FIG. 1 is a schematic diagram showing a circuit incorporating the present invention.

DETAILED DESCRIPTION OF THE DRAWINGS

Turning now more specifically to the drawing, FIG. 1 shows a typical device which can be used to embody the novel features which are provided by the present invention. The bridging sensor circuit 10 which is shown and described herein can be permanently installed across the telephone line to continually sense the current deviation on the telephone line itself. On the other hand, the bridging sensor circuitry can be installed in a telephone device which is connected to the line, but is in a non-functional state when the device is in the on-hook or is not operationally connected to the telephone line. This type of device could be an answering machine, telephone set, or telephone line branching switch. Usually, the type of device to which it is connected has a microprocessor circuit to provide the frequency counting and output signal function. For the sake of illustration it will be assumed that the herein disclosed circuit comprising the present invention is connected internally in one of these types of devices.

When mounted in conjunction with a telephone responsive device, the tip lead 5 of the telephone line is connected to the normally closed contact of a control relay 12. The normally closed contact is not connected and thus, the telephone line is left open and in an "on-hook" condition. This is a typical operation which is found in most telephone sets where once the hand set is lifted, the mechanical relay contacts will be shifted which in this particular circuit will include the relay contact 12. The ring lead 7 of the telephone line is connected through a current limiting resistor 18 to the primary winding of audio isolation transformer 14. The other side of the transformer primary is connected through a current limiting resistor 16 to the normally open contact of the relay 12. The normally open contact is also connected by lead 20 to the input of a full-wave, diode, bridge-type rectifier composed of diodes 34, 36, 38, and 40. The other side of the input to the bridge type rectifier is connected to the ring side of the incoming telephone line.

The secondary winding of the audio isolation transformer 14 is connected by leads 30 and 32 so as to provide audio input to the telephone device in which the bridging sensor circuit according to the present invention is mounted.

The diode components are selected to provide a tip-ring polarity guard to permit the circuit to function in a reverse polarity condition. The outputs 41, 43 for the diode rectifier provide full wave rectified voltage which can be filtered and regulated to a nominal 2 VDC and fed directly to the variable frequency oscillator 62 which is of the astable, voltage controlled type (VCO). Capacitors 52, 54, 56 and resistors 48, 50 provide the filtering function. Resistors 44, 46 provide the control voltage to vary the voltage controlled oscillator frequency.

The capacitor 66 can be selected to establish an approximate frequency of 1000 Hz output from the oscillator when a desired reference voltage of 2 VDC is present. A 0.01 mfd capacitor 68 shunts inputs 1 and 5 on the variable frequency oscillator 62. An optical coupler 64 to isolate the sensing circuit is connected to the oscillator output 62 which, in turn, feeds directly into a microprocessor 76 which not only reads the frequency of the variable frequency oscillator, but also stores this frequency measurement. An output limiting resistor 72 is connected in the line from the voltage controlled oscillator to the optical coupler.

In operation, when the relay 12 is engaged by the control device going off-hook the tip and ring connections of the telephone line are connected directly to the input side of the diode bridge rectifier. The output from the rectifier which is rectified DC voltage from the connected telephone line is filtered and regulated to approximately 2 VDC (line 70). This voltage powers an astable, voltage controlled oscillator 62. The oscillator output frequency is coupled directly to a suitable frequency measuring and storage device 76, such as a microprocessor, through an optical coupler to properly isolate the electronic circuits. If desired, the microprocessor can be part of the existing telephone device in which the circuitry is installed or can be provided separately. The microprocessor is adapted to determine the frequency which is received from the voltage controlled oscillator and this frequency is recorded as a reference for later readings. Periodically, the microprocessor counts and compares subsequent readings with the reference reading.

If a second telephone device is energized to an off-hook condition on the same telephone line, this second device will add a measurable impedance to the existing telephone line. This impedance will increase the measurable loop current in the telephone line and this increase is sensed as a voltage change in the bridge sensing circuit 10. A reduced voltage in the sensing circuit causes the frequency of the voltage controlled oscillator 62 to decrease in the output of the sensing circuit. This decrease in frequency is measured by the microprocessor and when compared to the original reference frequency a deviation beyond a predetermined set range signifies that a second or additional telephone device has bridged the existing telephone line. Periodic readings of the output frequency from the sensing circuit is made by the microprocessor and compared with the reference frequency. At predetermined intervals, the reference frequency is updated to the latest frequency reading so that subsequent readings can be compared against the new reference frequency to determine if the condition or status of the line determined by the number of telephone devices bridging the telephone line has changed. Thus, the output of the bridging sensor circuit is used to identify changes in the number of devices which are actually bridging the same telephone line at the same moment.

In this way, the bridging sensor circuit which is described provides an instantaneous indication of the changing condition on the telephone line which is indicative of the presence or absence of one or more telephone devices. By utilizing the output signal from the sensing circuit, it can be easily determined when the telephone devices which are connected to the same telephone line go off or on-hook during use of the line.

It is to be understood that while the preferred embodiment has been described as having a reference voltage of approximately 2 volts DC and a reference frequency of 1000 Hz, any combination of components can be selected to vary the voltage and frequency, as desired, within the required operational parameters. Even though the electrical parameters can be changed within the circuit, the final novel results according to the present invention will remain the same.

While a bridging circuit for sensing the changing condition of a telephone line has been shown and described in detail, it is to be understood that this invention is not to be limited to the exact form or circuit disclosed and changes in detail and construction of the invention may be made without departing from the spirit thereof.

What is claimed is:

1. A telephone line bridging circuit for sensing when one or more telephone device is connected to a telephone line, said telephone line having a loop current and voltage present on the line, the bridging circuit comprising:
   a) a rectifier means connected across a telephone line which is to be sensed;
   b) said rectifier means having an output voltage which is indicative of the loop current present in the telephone line;
   c) a voltage controlled oscillator means connected to said rectifier means, said rectifier output voltage being arranged to power said voltage controlled oscillator means, said oscillator means having an output having a frequency which is proportional to the rectifier output voltage and the loop current in said telephone line; and
   d) means for periodically measuring and storing the frequency of the output of said oscillator means, said measuring and storing means being arranged to compare the output frequency of subsequent measurements with prior measurements and provide a signal when the output frequency of the oscillator means deviates a predetermined amount from one or more prior measurements indicating a change in the loop current in said telephone line caused by the connection or disconnection of a telephone device to said telephone line.

2. A telephone line bridging circuit as defined in claim 1 wherein an isolation transformer is connected in parallel with said rectifier means whereby the audio signal from the telephone line can be fed to an audio responsive device.

3. A telephone line bridging circuit as defined in claim 1 wherein said rectifier means is a full-wave diode circuit.

4. A telephone line bridging circuit as defined in claim 1 wherein the output voltage from said rectifier means is connected through a suitable filter and regulating means to stabilize the voltage to said voltage controlled oscillator means.

5. A telephone line bridging circuit as defined in claim 1 wherein said means for measuring and storing the frequency of the output from said oscillator means is a microprocessor device which is capable of measuring the frequency and storing the resulting measurement.

6. A telephone line bridging circuit as defined in claim 5 wherein the microprocessor device further includes means for establishing one of the prior frequency measurements as a reference frequency and periodically comparing subsequent frequency measurements with the reference measurement and provide the signal when one of the subsequent frequency measurements deviates beyond a predetermined amount from the reference measurement.

7. A telephone line bridging circuit as defined in claim 5 wherein the means for measuring and storing the frequency of the output from said oscillator means compares the frequency measurements at predetermined time intervals and produces the signal when a subsequent frequency measurement deviates a predetermined amount from a prior frequency measurement.

8. A telephone line bridging circuit as defined in claim 1 wherein the telephone line bridging circuit is connected to a telephone device, said telephone device having an input control relay means which is connected to said telephone line, and said relay means is energized when said telephone device is activated whereby the bridging circuit is activated by said relay means.

9. A telephone line bridging circuit as defined in claim 1 wherein said rectifier means has an output voltage of approximately 2 VDC.

10. A telephone line bridging circuit as defined in claim 9 wherein the rectifier output voltage produces a frequency of approximately 1,000 Hz in the output from said voltage controlled oscillator means.

11. A telephone line bridging circuit as defined in claim 1 wherein an isolation means is connected between the voltage controlled oscillator means and said means for measuring and storing the frequency of the output of said oscillator means, said isolation means being arranged in electrically isolate the oscillator means from said measuring and storing means.

12. A telephone line bridging circuit for sensing when one or more telephone devices are connected or disconnected from a telephone line, said telephone line having a loop current and voltage, said bridging circuit being arranged within a telephone device, the circuit comprising:
  a) relay means connected to a telephone line and activated by said telephone device when a ring voltage is present on the telephone line;
  b) rectifier means connected to said relay means so that when said relay means is activated the telephone line is connected across said rectifier means, said rectifier means being of the full-wave type;
  c) said rectifier means having an output voltage which is indicative of the loop current present in the connected telephone line;
  d) voltage controlled oscillator means connected across the output of said rectifier mean whereby the frequency of the output from said oscillator means is proportional to the output voltage from said rectifier means; and
  e) microprocessor means arranged to receive the output from said oscillator means, said microprocessor means being arranged to periodically measure the frequency of the output, store one of the frequency measurements as a reference measurement, compare subsequent measurements with said reference measurement and produce a signal when one of the subsequent frequency measurements deviates a predetermined amount indicating that a telephone device has been connected to or disconnected from said telephone line.

13. A telephone line bridging circuit as defined in claim 12, wherein said rectifier means is a diode bridge type rectifier so that the bridging circuit will be protected from telephone line polarity reversal.

14. A telephone line bridging circuit as defined in claim 12, wherein the output voltage from said rectifier means is connected through a filter and regulator means to said oscillator means so that the voltage fed to the voltage controlled oscillator means has a stabilized reference voltage input.

15. A telephone line bridging circuit as defined in claim 11 wherein said isolation means is an optical coupler.

* * * * *